United States Patent
Edwards et al.

(10) Patent No.: US 11,240,168 B2
(45) Date of Patent: Feb. 1, 2022

(54) SYSTEM AND METHOD TO EXCHANGE IDENTITY GOVERNANCE DATA ACROSS MULTIPLE IDENTITY REPOSITORIES

(71) Applicant: International Business Machines Corporation, Armonk, NY (US)

(72) Inventors: David Edwards, Heathmont (AU); James Darwin, Brisbane (AU); David Kuehr-McLaren, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 111 days.

(21) Appl. No.: 16/734,460

(22) Filed: Jan. 6, 2020

(65) Prior Publication Data
US 2021/0211389 A1    Jul. 8, 2021

(51) Int. Cl.
*H04L 12/863* (2013.01)
*H04L 12/725* (2013.01)
*H04L 29/08* (2006.01)
*H04L 29/06* (2006.01)

(52) U.S. Cl.
CPC ......... *H04L 47/6215* (2013.01); *H04L 45/30* (2013.01); *H04L 63/083* (2013.01); *H04L 67/10* (2013.01)

(58) Field of Classification Search
CPC ..... H04L 47/6215; H04L 45/30; H04L 67/10; H04L 63/08
See application file for complete search history.

(56) References Cited

U.S. PATENT DOCUMENTS

| | | | |
|---|---|---|---|
| 7,428,750 B1 | 9/2008 | Dunn et al. | |
| 8,856,957 B1 | 10/2014 | Roth et al. | |
| 2006/0021010 A1 | 1/2006 | Atkins et al. | |
| 2008/0279133 A1* | 11/2008 | Bienfait | H04L 67/16 370/315 |

(Continued)

FOREIGN PATENT DOCUMENTS

| | | |
|---|---|---|
| CN | 108712444 | 10/2018 |
| EP | 0697662 | 2/1996 |

OTHER PUBLICATIONS

CA Technologies; Identity and Access Management as a Service (IAMaaS) Across Cloud and On-premise Environments: Best Practices for Maintaining Security and Control; 2014.

(Continued)

*Primary Examiner* — Jeffrey M Rutkowski
*Assistant Examiner* — Chae S Lee
(74) *Attorney, Agent, or Firm* — Anthony V. S. England; Jeffrey S. LaBaw; Susan M. Maze

(57) ABSTRACT

A technique for identity governance (IG) data exchange includes receiving, by a first adapter, an identity governance message from a first identity governance resource for transmission of the identity governance message to a second identity governance resource. The first adapter analyzes the message and, based on the analysis, selects a routing policy to apply to the message. Based on the routing policy, the adapter determines a select input queue from a plurality of input queues to receive the message and writes the message to the select input queue. The message is then routed from the select input queue to an output queue, and then a second adapter transfers the message from the output queue to the second identity governance resource.

20 Claims, 7 Drawing Sheets

(56) References Cited

U.S. PATENT DOCUMENTS

| | | |
|---|---|---|
| 2009/0150981 A1 | 6/2009 | Amies et al. |
| 2010/0257369 A1 | 10/2010 | Baker |
| 2011/0314533 A1 | 12/2011 | Austin et al. |
| 2012/0102183 A1* | 4/2012 | Murakami ............ G06F 9/5072 709/224 |
| 2014/0173754 A1 | 6/2014 | Barbir |
| 2014/0181003 A1 | 6/2014 | Kling et al. |
| 2014/0181965 A1 | 6/2014 | Kling et al. |
| 2016/0036855 A1 | 2/2016 | Gangadharappa et al. |
| 2017/0331791 A1 | 11/2017 | Wardell et al. |
| 2018/0095997 A1* | 4/2018 | Beveridge ........... G06F 9/45558 |
| 2019/0312857 A1* | 10/2019 | Lander ................. H04L 9/0891 |
| 2019/0334913 A1* | 10/2019 | Cicchitto ............ H04L 67/1002 |
| 2020/0314145 A1* | 10/2020 | Bolignano ........... G06Q 10/103 |

OTHER PUBLICATIONS

Mell, Peter; et al.; The NIST Definition of Cloud Computing; Recommendations of the National Institute of Standards and Technology (NIST); NIST Special Publication 800-145; Sep. 2011.

\* cited by examiner

SYSTEM AND METHOD TO EXCHANGE IDENTITY GOVERNANCE DATA ACROSS MULTIPLE IDENTITY REPOSITORIES

BACKGROUND

The field of identity governance and administration (IGA) has grown significantly. For example, IGA started as a means to centrally manage user accounts and access to computer systems. IGA was originally known as identity management, or provisioning. The field has grown to include governance aspects, such as approval processes, access recertification and risk management (e.g., separation of duties violations).

As IGA has evolved, so have the computing environments it operates in. Originally, IGA was focused on managing local accounts on a small set of on-premise systems for employees. Currently, IGA encompasses managing access for a wide range of systems, both on-premise and in cloud-hosted services. The IGA systems, and the software products providing the provisioning and governance capabilities, may also be hosted on-premise or in the cloud.

BRIEF SUMMARY

According to one aspect of the present disclosure, a method and technique for identity governance (IG) data exchange is disclosed. The method includes receiving, by a first adapter, an identity governance message from a first identity governance resource for transmission of the identity governance message to a second identity governance resource. The first adapter analyzes the message and, based on the analysis, selects a routing policy to apply to the message. Based on the routing policy, the adapter determines a select input queue from a plurality of input queues to receive the message and writes the message to the select input queue. The message is then routed from the select input queue to an output queue, and then a second adapter transfers the message from the output queue to the second identity governance resource.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which.

DETAILED DESCRIPTION

Figure 1:
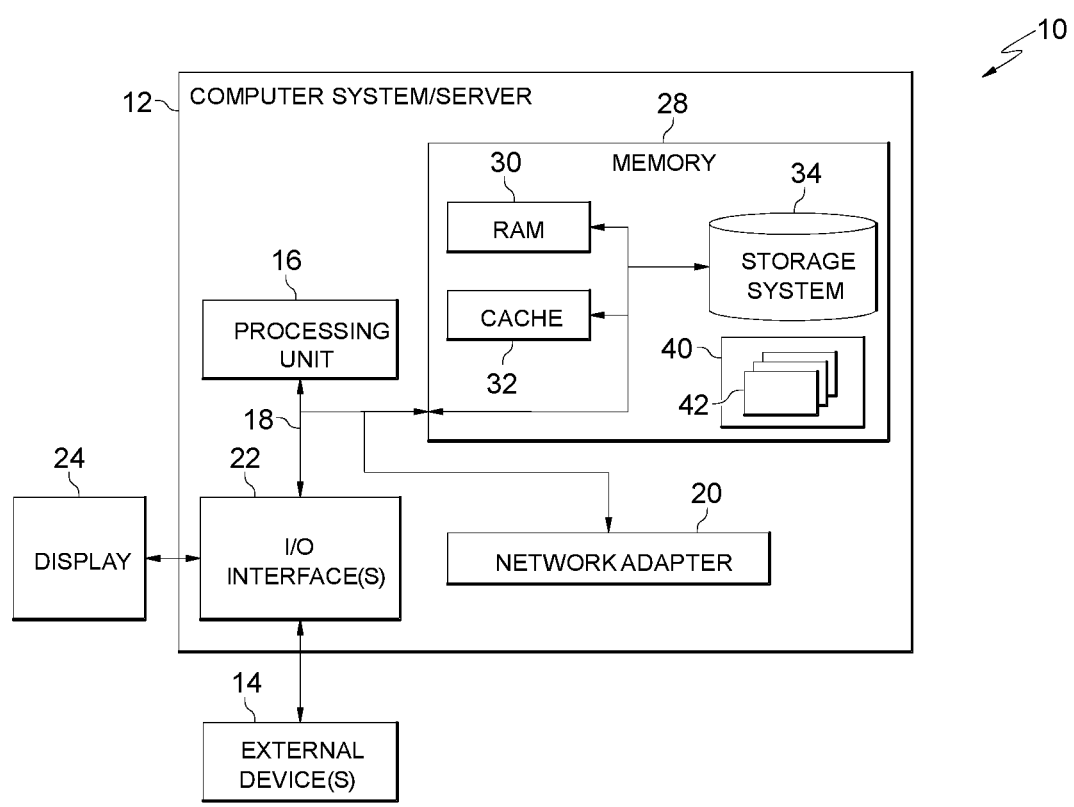
FIG. 1 depicts a cloud computing node according to an embodiment of the present disclosure.

Embodiments of the present disclosure provide a method, system and computer program product for identity governance (IG) information exchange. Embodiments of the present disclosure are configured to enable the passage and routing of IG data between identity governance and administration (IGA) systems, and the information technology (IT) systems containing accounts and access definitions, in a hybrid-cloud and/or multi-cloud environment. For example, in one embodiment, the technique includes a first adapter that receives an IG from a first IG resource for transmission of the message to a second IG resource. The first adapter analyzes the message and, based on that analysis, determines a routing policy to apply to the message. Based on the routing policy, the adapter determines a select input queue from a plurality of input queues to receive the message and writes the message to the select input queue. The message is then transferred from the select input queue to an output queue, and then a second adapter retrieves the message from the output queue and delivers the message to the second IG resource. The adapters are configured to implement logic to communicate with external IG systems with different formats, thereby supporting IG data exchange in a "many: many" model where there may be multiple IGA systems (like identity management products) and many systems with identity repositories, and where these systems may be on-premise, in the cloud or across combinations of these. Embodiments of the present disclosure enable data delivery and provide the flexibility to support different implementation needs.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
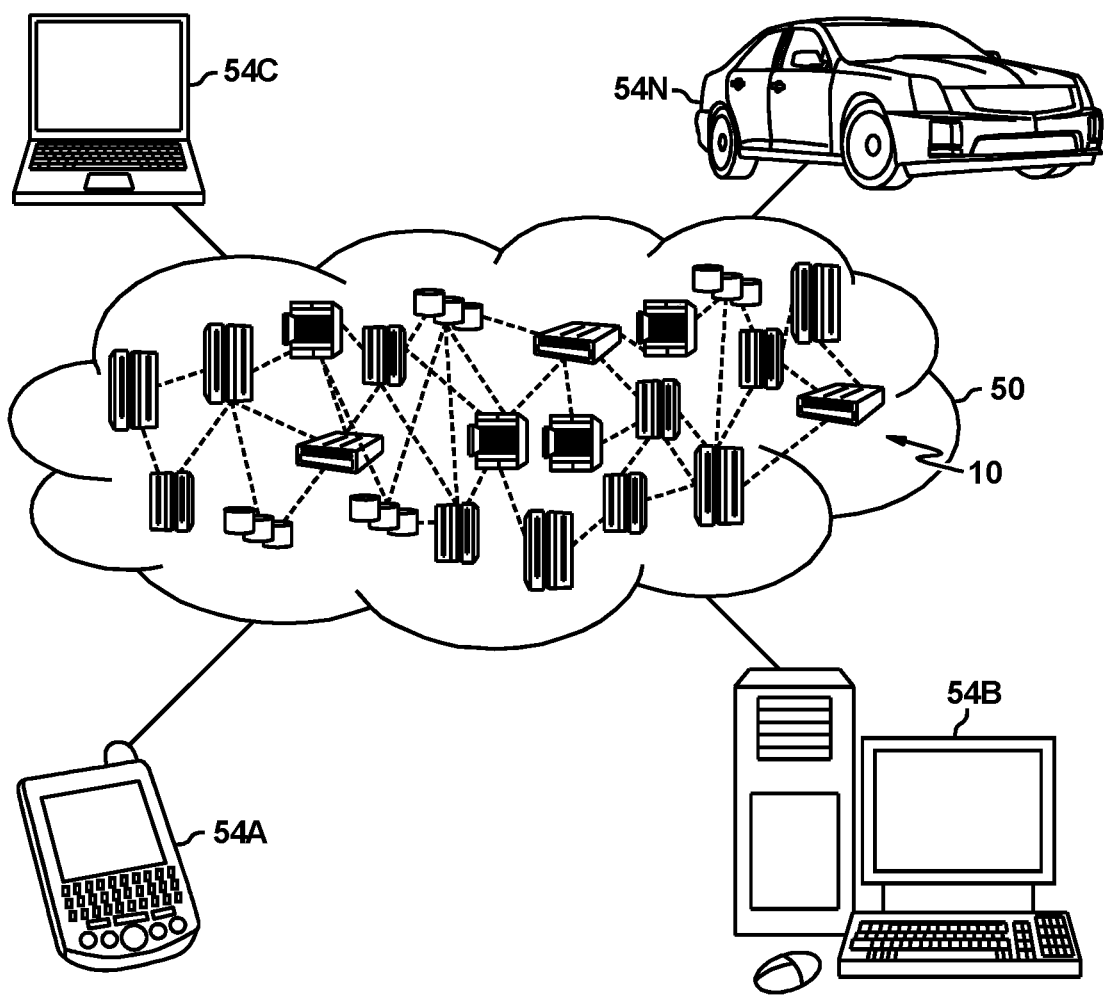
FIG. 2 depicts a cloud computing environment according to an embodiment of the present disclosure.
Figure 3:
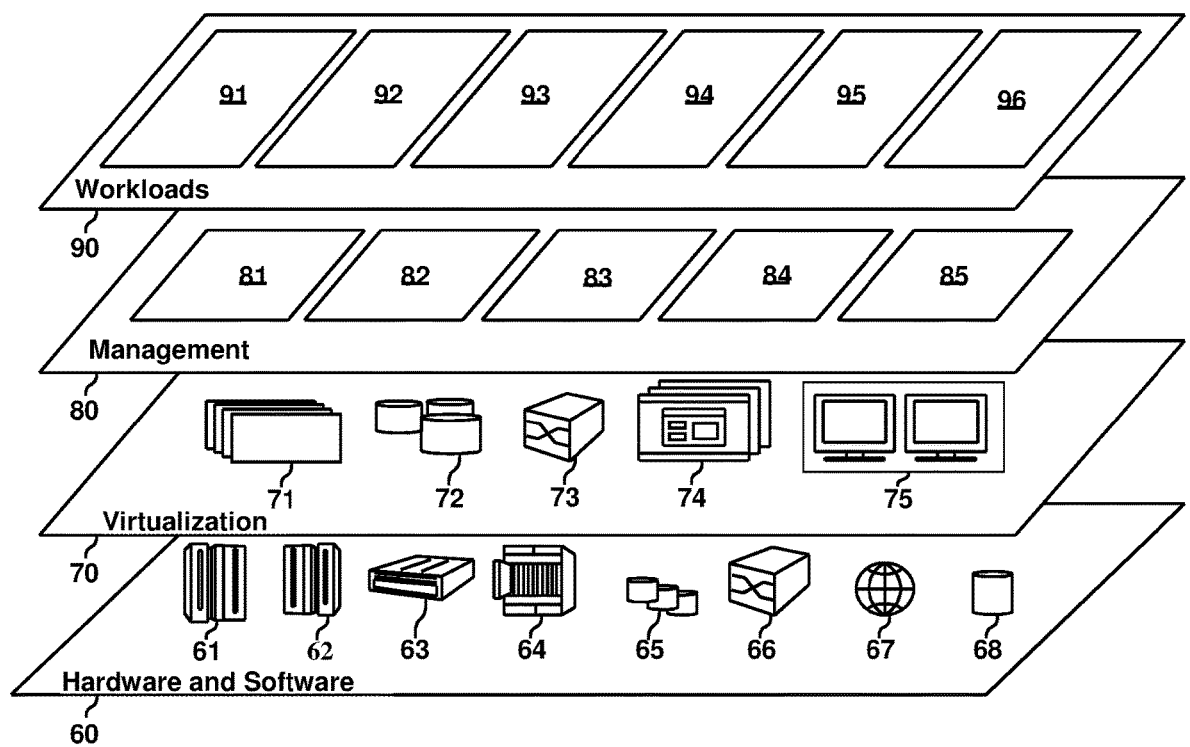
FIG. 3 depicts abstraction model layers according to an embodiment of the present disclosure.

With reference now to the Figures and in particular with reference to FIGS. 1-3, exemplary diagrams of data processing environments are provided in which illustrative embodiments of the present disclosure may be implemented. It should be appreciated that FIGS. 1-3 are only exemplary and are not intended to assert or imply any limitation with regard to the environments in which different embodiments may be implemented. Many modifications to the depicted environments may be made.

Referring now to FIG. 1, a schematic of an example of a cloud computing node 10 is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Referring now to FIG. 2, an illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and identity governance 96. For example, as will be described in greater detail below, functionality associated with identity governance 96 may include the passage and routing of identity governance data between identity governance and administration (IGA) systems, and the information technology (IT) systems containing accounts and access definitions, in a hybrid-cloud and/or multi-cloud environment.

Figure 4:
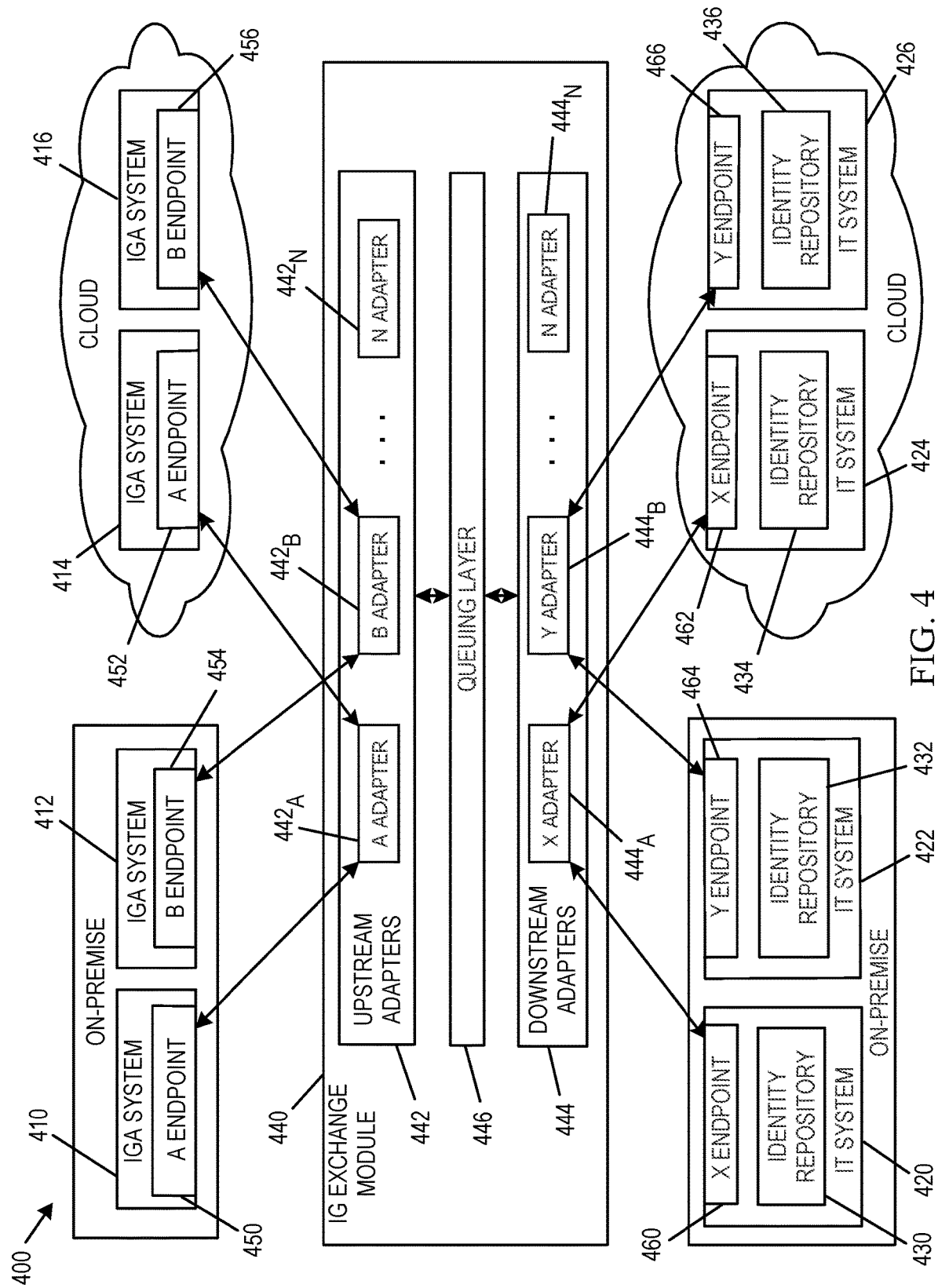
FIG. 4 depicts an embodiment of a data processing system in which illustrative embodiments of an identity governance (IG) exchange system may be implemented.

FIG. 4 is a diagram illustrating an embodiment of an identity governance exchange system 400 according to the present disclosure. Various components of system 400 may be implemented on data processing systems or platforms such as, but not limited to, servers 12, 61, 62, 63 and/or 64, client or client devices 54A, 54B, 54C, and/or 54N, or at other data processing system and/or computing system locations. In FIG. 4, system 400 illustrates exemplary locations of various identity governance components/resources. For example, in FIG. 4, system 400 includes identity governance administration (IGA) systems 410, 412, 414, and 416, and information technology (IT) systems 420, 422, 424, and 426. IT systems 420, 422, 424, and 426 may comprise any type of data processing system each having an identity repository 430, 432, 434, and 436, respectively, storing therein identity-related and/or identity governance data such as, but not limited to, user account information, password credentials, user profile or identity data, role and/or access authentication data, and/or any other type of data used to identity a particular user/entity and/or control access to one or more computing environment and/or enterprise resources. IGA systems 410, 412, 414, and 416 may comprise data processing systems having hardware and/or software resources to perform various administrative and/or management functions associated with and/or utilizing identity governance data (e.g., data of repositories 430, 432, 434, and 436). For example, IGA systems 410, 412, 414, and 416 may be utilized to create/modify/delete user accounts, provide resource access management, provide enterprise password management, provision roles and entitlements, and generally control/manage access to various enterprise resources. In the illustrated embodiment, IGA systems 410 and 412 are depicted as being "on-premise" while IGA systems 414 and 416 are depicted as being cloud-based. Cloud-based resources may include a private cloud (e.g., a cloud infrastructure operated solely for an organization—it may be managed by the organization or a third party) or a community cloud (e.g., a cloud infrastructure that is shared by several organizations and supports a specific community that has shared concerns (e.g., mission, security requirements, policy, and compliance considerations)—it may be managed by the organizations or a third party). "On-premise" generally means at the customer's or enterprise's physical location or corresponding to a local enterprise environment. It should be understood that the locations and/or quantities of IGA systems and IT systems may vary (e.g., non-premise and/or non-cloud locations).

In the illustrated embodiment, system 400 includes an IG exchange module 440 for supporting the passage and routing of IG data between IGA systems 410, 412, 414, and 416, and the IT systems 420, 422, 424, and 426 containing accounts and access definitions (e.g., the data in repositories 430, 432, 434, and 436), in a hybrid-cloud and/or multi-cloud environment. For example, IG exchange module 440 enables the mapping of IG data elements in transit, and IG exchange module 440 provides for the static and dynamic routing of IG data to efficiently prioritize specific IG data and/or IG data flows within the system/environment. In the illustrated embodiment, only a single IG exchange module 440 depicted; however, it should be understood that IG data elements may flow through multiple IG exchange modules 440 before reaching a target IG resource from an originating IG resource. In FIG. 4, IG exchange module 440 includes adapter layers 442 and 444, and a queuing layer 446 between adapter layers 442 and 444. In the illustrated embodiment, adapter layer 442 is identified as having "upstream" adapters, and adapter layer 444 is identified as having "downstream" adapters to illustrate an exemplary IG data flow from upstream (e.g., from IGA systems 410, 412, 414, and 416) to a downstream target (e.g., to IT systems 420, 422, 424, and 426); however, it should be understood that the IG data flow may be reversed. Further, IG exchange module 440 may support the passage and routing of IG data between IGA systems 410, 412, 414, and 416 (whether on-premise or in the cloud) and/or between IT systems 420, 422, 424, and 426. IG exchange module 440 may be implemented in any suitable manner using known techniques that may be hardware-based, software-based, or some combination of both. For example, IG exchange module 440 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system). Further, components of IG exchange module 440 may be located solely on-premise, solely in the cloud, a combination thereof (e.g., one or more components located on-premise and one or more components being cloud-based) or at any other non-premise or non-cloud data processing system location.

In the illustrated embodiment, IGA systems 410 and 414 are identified as having "A" endpoints 450 and 452, respectively, and IGA systems 412 and 416 are identified as having "B" endpoints 454 and 456, respectively. "A" endpoints 450 and 452 and "B" endpoints 454 and 456 represent different types of IGA systems having, for example, different types of communication protocols such that adapter layer 442 includes different types of discrete adapters $442_A$-$442_N$ for communicating with the different types of IGA systems (e.g., an "A" adapter $442_A$ for communicating with "A" endpoint 450 and 452 types of IGA systems, a "B" adapter $442_B$ for communicating with "B" endpoint 454 and 456 types of IGA systems, etc.). For example, IGA systems 410 and 414 may communication in accordance with the system for cross-domain identity management (SCIM) language or protocol such that "A" adapter $442_A$ is configured to communicate using the SCIM protocol to facilitate communications with IGA systems 410 and 414. Similarly, IGA systems 412 and 416 may communication in accordance with the lightweight directory access protocol (LDAP) such that "B" adapter $442_B$ is configured to communicate using LDAP to facilitate communications with IGA systems 412 and 416. Similarly, IT systems 420 and 424 are identified as having "X" endpoints 460 and 462, respectively, and IT systems 422 and 426 are identified as having "Y" endpoints 464 and 466, respectively. "X" endpoints 460 and 462 and "Y" endpoints 464 and 466 represent different types of IT systems having different types of agents, APIs, interfaces, communication protocols, etc., such that adapter layer 444 includes different types of discrete adapters $444_X$-$444_N$ for communicating with the different types of IT systems (e.g., an "X" adapter $444_X$ for communicating with "X" endpoint 460 and 462 types of IT systems, a "Y" adapter $444_Y$ for communicating with "Y" endpoint 464 and 466 types of IT systems, etc.). Thus, embodiments of the present disclosure enable a pluggable architecture through the adapter layers 442 and 444 that provide for different communication protocols to implement not only the passage of identity data, but also any logic required to provision or reconcile accounts and access, pull, or push identity changes from/to identity repositories (e.g., human resource (HR) systems). Adapters in adapter layers 442 and 444 are configured to translate and/or format IG data/messages corresponding to a format required by a target IG resource to receive the data/message. As will be described further below, queuing layer 446 provides for the storing and forwarding of identity governance messages or data between the other components in IG exchange module 440. Queuing layer 446 could be implemented in any message queuing technology that provides for guaranteed delivery of messages and queue/message monitoring.

Figure 5:
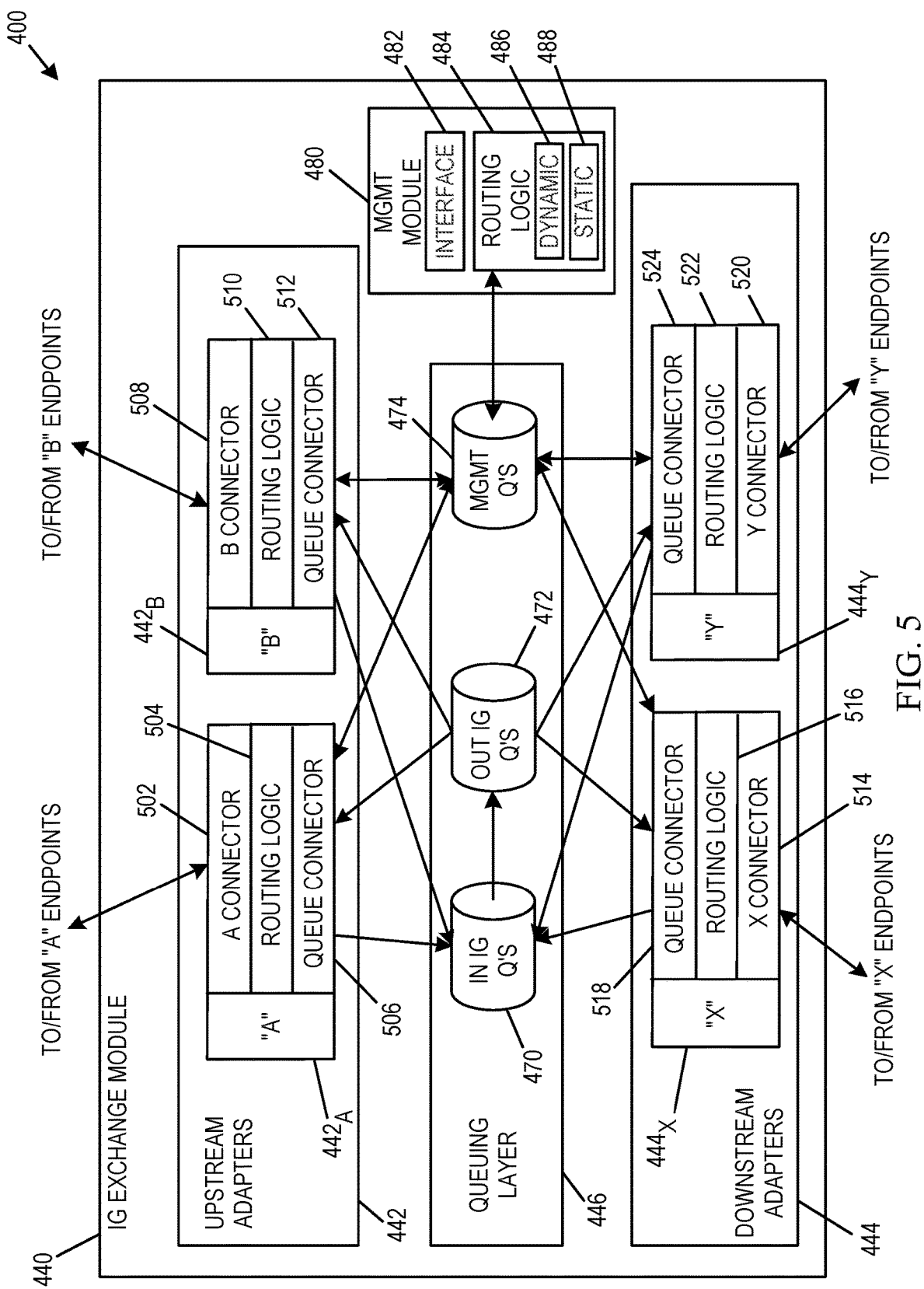
FIG. 5 depicts an embodiment of an IG exchange module of the system depicted in FIG. 4 according to the present disclosure.

FIG. 5 is a diagram illustrating an embodiment of IG exchange module 440 according to the present disclosure. As described above, IG exchange module 440 includes adapter layers 442 and 444 and queuing layer 446. In the illustrated embodiment, only adapters $442_A$, $442_B$, $444_X$, and $444_Y$ are depicted; however, it should be understood that other/additional adapters may be included and similarly configured as described below. In FIG. 5, queuing layer 446 includes inbound or input IG queues 470, outbound or output IG queues 472, and management queues 474. Input IG queues 470 include one or more queues for receiving data/messages from adapter layers 442 and/or 444. Output IG queues 472 include one or more queues for outputting data/messages to adapter layers 442 and/or 444. For example, input IG queues 470 may include a plurality of different queues each designated for a specific data flow or data routing policy. For example, input IG queues 470 may include high priority input queues and low priority input queues such that high priority IG data/messages are input to the high priority input IG queues 470 by adapter layers 442/444, and low or non-high priority data/messages are input into the low priority input IG queues 470 by adapter layers 442/444. Input IG queues 470 may also include one or more different queues specified based on a target location for specific data/messages or based on the type of data/message being communicated. For example, there may be specific input IG queues 470 designated for data/messages remaining within an environment and other input IG queues 470 designated for data/communications being sent outside the environment. Similarly, for example, there may be specific input IG queues 470 designated for account creation/deletion data/messages and other input IG queues 470 designated for password reset data/messages. Thus, it should be understood that the quantity, type, and/or designation of input IG queues 470 may be flexibly configured to accommodate a desired data flow policy or message content policy.

Similar to the input IG queues 470, output IG queues 472 may include a plurality of different output queues each designated for a specific data flow or data routing policy. For example, output IG queues 472 may include high priority output queues and low priority output queues such that high priority IG data/messages are placed in the high priority output IG queues 472, and low or non-high priority data/messages are placed in the low priority output IG queues 472. Output IG queues 472 may also include one or more different queues specified based on a target location for specific data/messages or based on the type of data/message being communicated. For example, there may be specific output IG queues 472 designated for data/messages remaining within an environment and other output IG queues 472 designated for data/communications being sent outside the environment. Similarly, for example, there may be specific output IG queues 472 designated for account creation/deletion data/messages and other output IG queues 472 designated for password reset data/messages. Thus, it should be understood that the quantity, type, and/or designation of output IG queues 472 may be flexibly configured to accommodate a desired data flow policy or message content policy.

In the illustrated embodiment, queuing layer 446 includes separate and distinct input IG queues 470 and output IG queues 472 such that adapters in adapter layers 442/442 write IG messages to the input IG queues 470 and retrieve IG messages from the output IG queues 472. However, in some embodiments, queuing layer 446 may be configured having one or more distinct input/output queues such that adapters in adapter layers 442/444 write IG messages to and pull IG messages from the same input/output queue (e.g., similar to a first-in-first-out (FIFO) buffer). For example, in such an embodiment, there may be one high priority queue for high priority password reset IG messages. In this example embodiment, an adapter in adapter layer 442, for example, may write a high priority password reset IG message to this high priority queue, and then an adapter from adapter layer 444 may retrieve the high priority password reset IG message from the same queue (instead of retrieving the high priority password reset IG message from a separate output queue). It should be understood, however, that the quantity and/or designation of the different types of combined input/output queues may vary as described above (e.g., based on message type or content, target location, etc.)

Management queues 474 may include one or more queues for disseminating or distributing data/message routing policies to adapter layers 442 and 444. For example, in the illustrated embodiment, IG exchange module 440 includes a management module 480 having an interface 482 and routing logic 484. Management module 480 is configured to enable centralized management and control of IG data/message routing in a hybrid-cloud environment. For example, interface 482 may include a user interface enabling an administrator/user to input and/or manage data flow and routing policies for different types of IG communications. For instance, in the illustrated embodiment, routing logic 484 includes dynamic routing logic 486 and static routing logic 488. Dynamic routing logic 486 may include data flow or message routing policies that are used by adapter layers 442/444 to determine and/or select where to route specific IG data/messages. Static routing logic 488 may include data flow or message routing policies that are used to control the routing of data/messages once received in queuing layer 446. For example, static routing logic 488 could be applied between queues in queuing layer 446 (or between the queuing layer 446 of one IG exchange module 440 and a queuing layer 446 of another IQ exchange module 440). For instance, a simple exemplary implementation could define a single input IG queue 470 and a single output IG queue 472, and the static routing policy as defined by static routing logic 488 would route all messages from the input IG queue 470 to the output IG queue 472. Dynamic routing logic 486 may include policies indicating the manner that adapters in adapter layers 442/444 connect with output IG queues 472 in queuing layer 446 for retrieving IG messages therefrom (e.g., checking certain output IG queues 472 according to different frequencies, prioritizing certain output IG queues 472 over other output IG queues 472 if messages are contained therein, checking certain output IG queues 472 associated with a certain target IG resource according to a certain schedule or frequency, etc.).

In the embodiment illustrated in FIG. 5, adapter $442_A$ includes an "A" connector 502, routing logic 504, and a queue connector 506. "A" connector 502 is for connecting/communicating with "A" endpoints (e.g., "A" endpoints 450 and 452 of IGA systems 410 and 414, respectively (FIG. 4)). Queue connector 506 is for connecting/communicating with input and output queues of queuing layer 446. Routing logic 504 includes rules, policies, and/or instructions for routing IG data/messages received from IGA systems 410 and 414. Adapter $442_B$ includes a "B" connector 508, routing logic 510, and a queue connector 512. "B" connector 508 is for connecting/communicating with "B" endpoints (e.g., "B" endpoints 454 and 456 of IGA systems 412 and 416, respectively (FIG. 4)). Queue connector 512 is for connecting/communicating with input and output queues of queuing layer 446. Routing logic 510 includes rules, policies, and/or instructions for routing IG data/messages received from IGA systems 412 and 416. Adapter $444_X$ includes an "X" connector 514, routing logic 516, and a queue connector 518. "X" connector 514 is for connecting/communicating with "X" endpoints (e.g., "X" endpoints 460 and 462 of IT systems 420 and 424, respectively (FIG. 4)). Queue connector 518 is for connecting/communicating with input and output queues of queuing layer 446. Routing logic 516 includes rules, policies, and/or instructions for routing IG data/messages received from IT systems 420 and 424. Adapter $444_Y$ includes a "Y" connector 520, routing logic 522, and a queue connector 524. "Y" connector 520 is for connecting/communicating with "Y" endpoints (e.g., "Y" endpoints 464 and 466 of IT systems 422 and 426, respectively (FIG. 4)). Queue connector 524 is for connecting/communicating with input and output queues of queuing layer 446. Routing logic 522 includes rules, policies, and/or instructions for routing IG data/messages received from IT systems 422 and 426.

In operation, adapters $442_A$, $442_B$, $444_X$, and $444_Y$ are configured to access and/or otherwise connect with management queues 474 to retrieve and store respective routing logic 504, 510, 516, and 522 defining specific routing policies for different IG events/messages. For example, as described above, dynamic routing logic 486 may be written to management queues 474 by management module 480. Adapters $442_A$, $442_B$, $444_X$, and $444_Y$ are configured to check management queues 474 (e.g., periodically, according to a set schedule, in response to a trigger or notification, etc.) and retrieve dynamic routing logic 486 for any routing policies (or changes to routing policies) that apply to them, consume the relevant routing policy, and store the routing policy locally (e.g., as routing logic 504, 510, 516, and 522). In response to receiving an IG event and/or message, adapters $442_A$, $442_B$, $444_X$, and $444_Y$ analyze the message (e.g., parse or pull apart the message, check for a flag or other marker as part of the message, analyze the content of the message, etc.) to otherwise identify some attribute corresponding to the IG message to indicate or identify a specific routing policy for the received IG message (e.g., a specific type of IG event/message, a target location for the IG event/message, a source or originator of the message, etc.). Based on the identified attribute, adapters $442_A$, $442_B$, $444_X$, and $444_Y$ check respective routing logic 504, 510, 516, and 522 to select the specific routing policy for that IG message and, based on that specific routing policy, write the IG message (or event) to the specific input IG queue 470 as set forth by the respective routing logic 504, 510, 516, and 522. Static routing logic 488 in IG exchange module 440 passes the event/message from the specific input IG queue 470 to a corresponding output IG queue 472. Adapters $442_A$, $442_B$, $444_X$, and $444_Y$ also consume events/messages from the output IG queues 472 based on the dynamic routing logic 504, 510, 516, and 522, consume the IG message, translate the IG message (as necessary) into a format required of the target IG resource, and communicate the IG message to the respective IG resource. In some embodiments, dynamic routing logic 504, 510, 516, and 522 defines the manner that respective adapters $442_A$, $442_B$, $444_X$, and $444_Y$ check the output IG queues 472 for events/messages (e.g., defining a round robin schedule for checking certain output IG queues 472, checking high priority output IG queues 472 at a certain frequency greater than other output IG queues 472, checking certain output IG queues 472 in connection with certain types of IG events/messages according to a certain schedule or frequency, etc.).

As an example, consider the processing of a password change request being sent through IG exchange module 440 from an upstream IGA system to multiple downstream IT systems with identity repositories and accounts needing a password change. In this example, the password change request is being initiated by IGA system 410 with the downstream target IT systems being IT systems 420 and 426, and a password change request is considered to be a high priority type of IG event. Initially, IGA system 410 sends an event/message to IG exchange module 440 with a password change request (e.g., via upstream adapter $442_A$). Adapter $442_A$ consumes the event/message, analyzes the event/message and identifies an attribute indicating that the event/message is password change request and/or is otherwise a high priority event/message. Adapter $442_A$ accesses its dynamic routing logic 504 and selects a specific high priority input IG queue 470 that should receive the event/message. Adapter $442_A$ then writes the event/message to the corresponding high priority input IG queue 470 (e.g., via queue connector 506). The static routing logic 488 in the queuing layer 446 causes the event/message to be transferred from the specific a high priority high priority input IG queue 470 to a specific high priority output IG queue 472. Downstream adapters in the adapter layers 444 are configured to check the output IG queues 472 in the queuing layer to consume events/messages therefrom (e.g., periodically, according to a set schedule, in response to some trigger, when available to process an event/message, etc.). Thus, in this example, adapters $444_X$ and $444_Y$ check the high priority output IG queue 472 via respective queue connectors 518 and 524 based on their respective dynamic routing logic 516 and 522 (e.g., checking the high priority output IG queues 472 more frequently than low priority output IG queues 472 or other output IG queues 472), consume the password change event/message, translate it into the format required of the target IT systems 420 and 426, and forward the password change event/message to the target IT systems 420 and 426 (e.g., "X" connector 514 and "y" connector 520). The target IT systems 420 and 426 apply the change, and then the results of the change flow back up through the IG exchange module 440 (e.g., via adapter layer 444, queuing layer 446, and then adapter layer 442) to the originating IGA system (e.g., IGA system 410).

Adapters in adapter layers 442 and 444 may use a variety of different techniques for analyzing received IG events/messages to facilitate the selection of corresponding routing policies for the respective events/messages. For example, in one embodiment, an incoming IG message is received by the relevant IG exchange module 440 adapter. As indicated above, the adapters in adapter layers 442 and 444 have an endpoint connector that understands the format of the incoming message, routing logic, and the queue connector (e.g., for adapter 442A, endpoint connector 502 understands the format of the incoming message, and adapter 442A has routing logic 504 and queue connector 506). For the incoming message, the endpoint connector (e.g., connector 502) will unpack the message and store it as a set of attribute value pairs. Routing logic 504 will access its routing policies and select/apply an applicable routing policy based on an analysis of the unpacked incoming message. For example the incoming message may have an "Event=Password" attribute value or a "Priority=High" attribute value. There may be a routing policy that indicates "if event=password, write message to high priority queue" or "if priority=high, write message to high priority queue". In this example, the incoming message is written to the high priority input IG queue 470 by the queue connector (e.g., queue connector 506). This approach could be used for any attribute or attribute combinations in the incoming message. For example, "if destination=ABC, write message to external queue" or "if attribute1=DEF and attribute2=GHI, then write event to XYZ queue".

Another example of processing via IG exchange module 440 is the handling of a change of routing policy. For example, an administrator or user may implement a routing change (priority, location, etc.) for a particular type of IG event via IG exchange module 440. Initially, an administrator changes the routing policy for the particular IG event via the management module 480. Management module 480 puts the changed routing policy on a management queue 474. For example, there may be different management queues 474 corresponding to different adapters, different management queues 474 for different types of IG events, different management queues 474 for different policy change priorities, etc. Adapters in adapter layers 442 and 444 periodically check the management queues 474 for any routing policy changes that apply to them, consume the relevant routing policy change, and store/update their respective routing logic (e.g., routing logic 504, 510, 516, and 522) with the new/changed routing policy.

Thus, embodiments of the present disclosure provide IG exchange module 440 to support exchanging IG data between different IGA resources, whether the IG resources are on-premise or in the cloud. Queuing layer 446 supports the flow of IG data in and out of the IG exchange module 440, with management queues 474 and input/output IG queues 470/472 to enable static and dynamic IG message routing. Management module 480 with user and programming interfaces is configured to manage the configuration, scheduling, monitoring, data mapping and routing policies for the IG data. The static and dynamic routing of IG messages based on routing policies is implemented as configuration and programmatic logic. A routing policy as defined by routing logic 484 can use the specific data flow or message content to determine where to route the message, such as priority or location. For example, a password reset could be routed to the high priority queue for the target system. The routing could be implemented in the adapter layers 442/444 or in the queuing layer 446. Embodiments of the present disclosure leverage a flexible queuing layer 446 to support different deployment needs (e.g. queues based on message priority), and a dynamic routing policy can be defined centrally (e.g., via management module 480) and distributed to the adapters in adapter layers 442/444 via the management queues 474. The adapters in adapter layers 442/444 implement logic (e.g., via connectors 502, 508, 514, and 520) to communication with external IG systems/resources (e.g., different data formats), a mapping/routing component (e.g., routing logic 504, 510, 516, and 522), and a queue connector (e.g., connectors 506, 512, 518, and 524) to write messages to and pull messages from the queues in the queuing layer 446. Dynamic and static message routing is implemented in the adapter layers 442/444 and in queuing layer 446 based on a pluggable business rules engine (management module 480) to determine routing policy.

Figure 6:
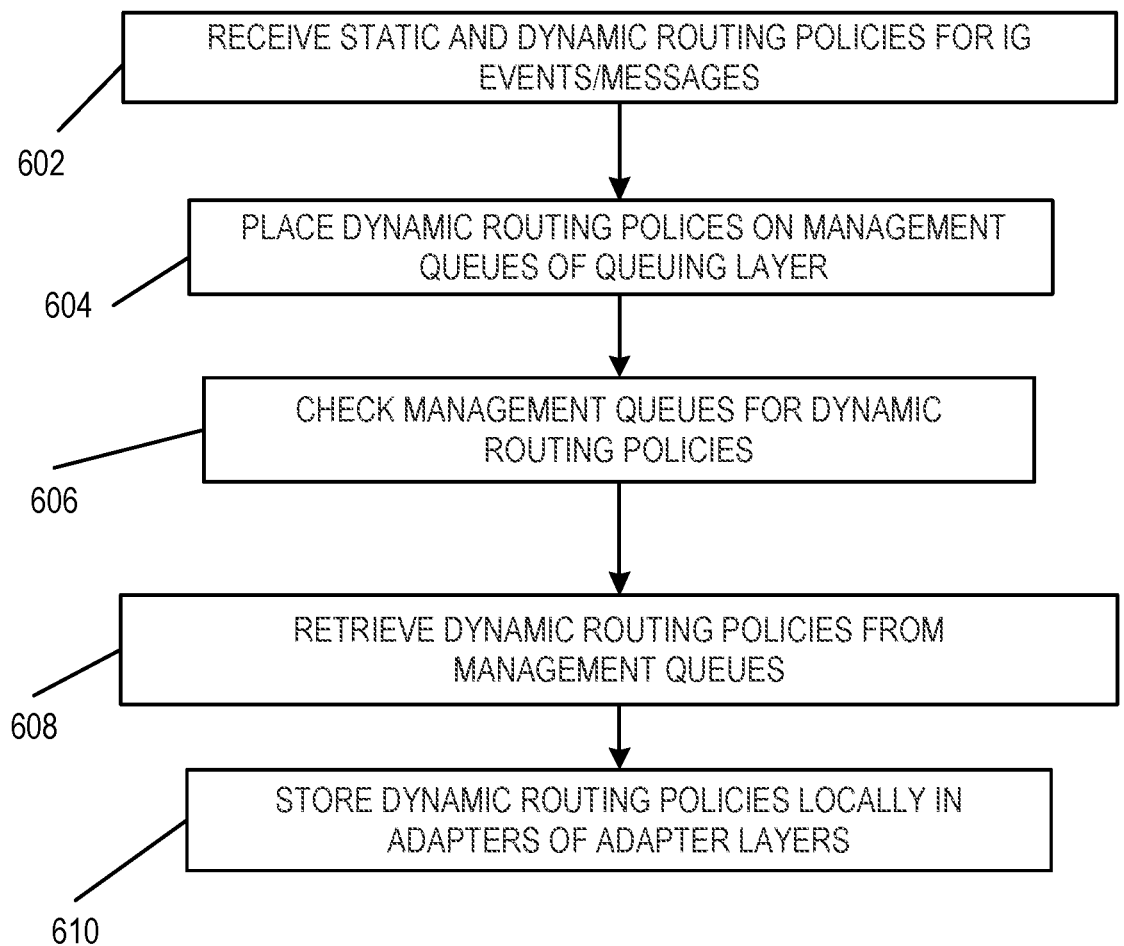
FIG. 6 depicts a flow diagram illustrating an embodiment of an IG exchange method in accordance with the present disclosure.

FIG. 6 is a flow diagram illustrating an embodiment of an IG exchange method in accordance with the present disclosure. The method begins at block 602, where management module 480 receives routing logic 484 defining various routing policies for IG events/messages. For example, as described above, routing logic 484 may include static routing logic 488 defining queue-to-queue data flow routing within queuing layer 446 and/or between different IG exchange modules 440 and dynamic routing logic 484 defining data flow routing policies implemented at adapter layers 442/444 for IG events/messages. At block 604, management module 480 places the dynamic routing policies defined by dynamic routing logic 486 in management queues 474. At block 606, adapters in adapter layers 442/444 check the management queues 474 for dynamic routing policies applicable to them. For example, there may be specific management queues 474 for each different adapter $442_A$-$442_N$ and $444_X$-$444_N$, there may be different management queues 474 for different types of IG events/messages, etc. At block 608, adapters in adapter layers 442/444 pull or retrieve dynamic routing policies from the management queues 474. At block 610, adapters in adapter layers 442/444 store the dynamic routing policies locally as routing logic 504, 510, 516, 522. As described above, the dynamic routing logic 486 may be initial data flow configurations/policies and/or changes to existing data flow policies.

Figure 7:
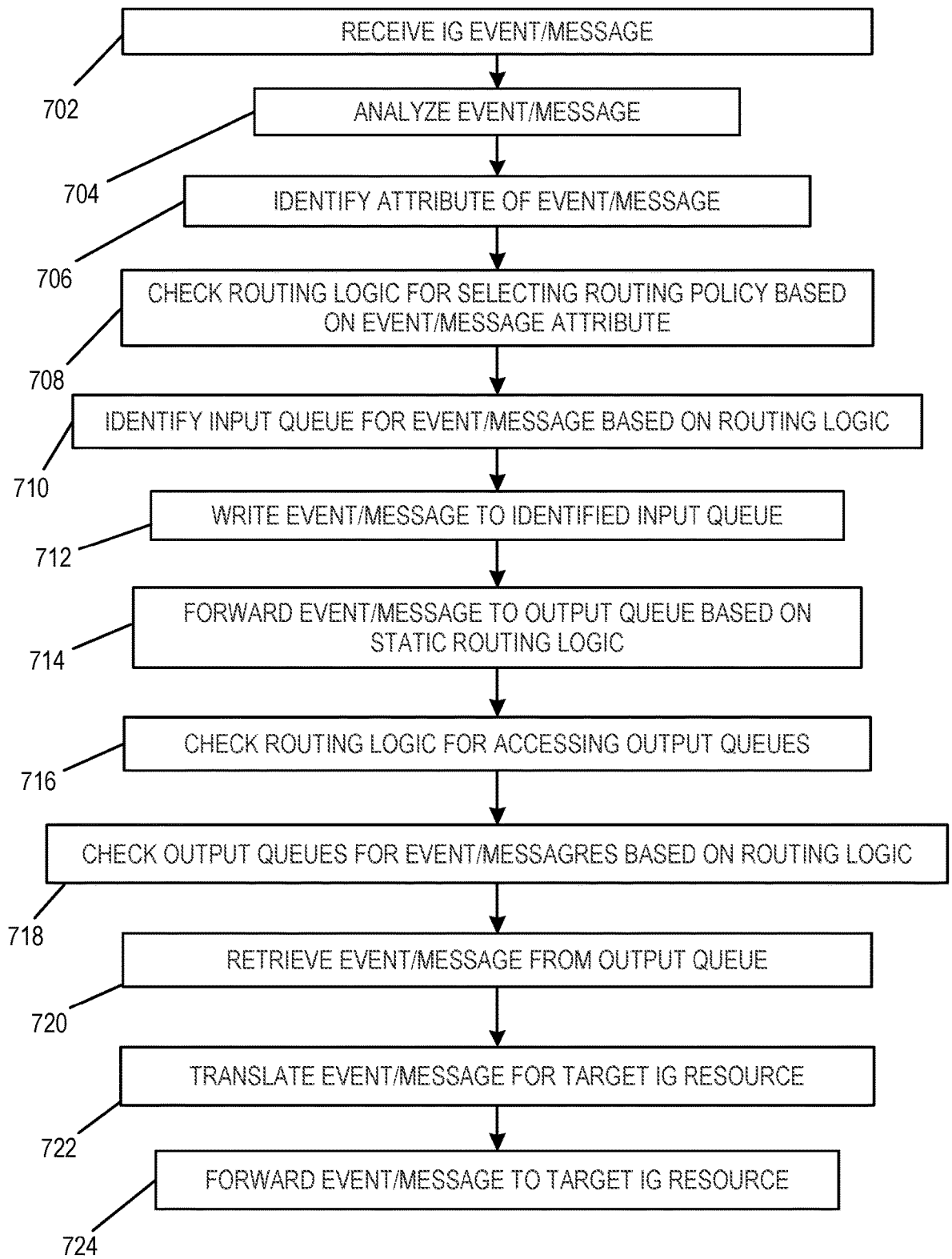
FIG. 7 depicts another flow diagram illustrating an embodiment of an IG exchange method in accordance with the present disclosure.

FIG. 7 is a flow diagram illustrating another embodiment of an IG exchange method in accordance with the present disclosure. The method begins at block 702, where an IG event/message is received (e.g., at adapter layer 442 or 444). At block 704, the adapter receiving the IG event/message analyzes the event/message to determine a specific dynamic routing policy to apply to the event/message. At block 706, the adapter receiving the event/message identifies an attribute associated with the event/message based on its analysis (e.g., identifying content in the event/message that indicates the event/message is a password reset event, identifying a flag in the message indicating that the message should be processed as a high priority event/message, etc.). At block 708, the adapter checks its routing logic (e.g., for adapter $442_A$, routing logic 504 is checked) to select a routing policy for the received IG event/message. At block 710, the adapter identifies a specific queue in the queuing layer 446 for the event/message based on its routing logic. For example, adapter $442_A$, for example, may identify a specific input IG queue 470 for the event/message based on its routing logic 504 for an event/message having a particular attribute associated therewith (e.g., being a high priority message for resetting a password). At block 712, the adapter writes the event/message to the identified input IG queue 470.

At block 714, queuing layer 446, using static routing policies as defined by static routing logic 488, passes the event/message from the input IG queue 470 to a specific output IG queue 472. At block 716, adapters in adapter layers check their respective routing logic for accessing output queues 472 for retrieving events/messages therefrom. For example, adapter $444_X$ may check certain high priority output queues 472 according to a certain frequency based on its routing logic 516. At block 718, adapters check the output queues 472 in queuing layer 446 for events/messages to process based on their routing logic. At block 720, adapters in adapter layers 442/444 retrieve events/messages from output IG queues 472. At block 722, the adapter translates the event/message corresponding to a target IG resource. At block 724, the adapter forwards the translated or formatted event/message to the target IG resource.

Thus, embodiments of the present disclosure utilize an IG exchange methodology that uses upstream and downstream adapter layers that implement logic to communication with external systems that may have different data formats or communication protocol requirements, especially in a hybrid could environment where some IG resources may reside on-premises and some IG resources may be cloud-based. The adapter layers 442/444 also implement dynamic data flow routing based on centrally defined policies corresponding to message content, message origination/destination, etc., that are distributed to the adapter layers 442/444. The IG exchange methodology also includes a programmable queuing layer 446 between the upstream and downstream adapter layers 442/444 using static routing policies for data flow within the queuing layer 446 (e.g., queue-to-queue routing within queuing layer 446 or routing from queuing layer 446 of one IG exchange module 440 to a queuing layer 446 of another IG exchange module 440). The adapters in the adapter layers 442/444 write/retrieve messages to/from the queuing layer 446 based on defined routing policies, translate the events/messages corresponding to the requirements of the target destination IG resource, and forward the event/message to the target destination IG resource for processing. Generally, complex topologies of point-to-point connections between systems are hard to manage. Where there are network domains being crossed (different network zones with firewalls in-between, particularly with internal networks and the public internet), a complex topology also represents a security risk where many holes need to be punched through firewalls (i.e., many complex firewall rules) that increases attack vectors. IG exchange module 440 acts or functions as a proxy in this situation, providing for a hub:spoke model rather than a many:many model, thereby minimizing the firewall openings required and enabling easier management. Further, since there is no single standard for identity governance messaging (e.g., legacy protocols like LDAP (Lightweight Directory Access Protocol), new standards like the System for Cross-Domain Identity Management (SCIM), and dozens of bespoke models), the architecture of the IG exchange module 440 enables each system communicating with the exchange module 440 to speak/communicate using a single messaging format and the exchange module 440 will translate from the sending format to the receiving format.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
receiving, by a first adapter of an identity governance exchange module, an identity governance message from a first identity governance resource for transmission of the identity governance message to a second identity governance resource, wherein the first identity governance resource includes an identity governance and administration system and the identity governance exchange module is interposed between the identity governance and administration system and the second identity governance resource for identity governance message flow therebetween;
analyzing, by the first adapter, the identity governance message;
selecting, based on the analysis, a routing policy to apply to the identity governance message;
based on the routing policy, determining a select input queue from a plurality of input queues of the identity governance exchange module to receive the identity governance message;
writing, by the first adapter, the identity governance message to the select input queue;
routing the identity governance message from the select input queue to an output queue of the identity governance exchange module; and
transferring, by a second adapter of the identity governance exchange module, the identity governance message from the output queue to the second identity governance resource.

2. The method of claim 1, further comprising, retrieving, by the first adapter, the routing policy from a management queue of the identity governance exchange module.

3. The method of claim 1, further comprising:
writing the routing policy to a management queue of the identity governance exchange module; and
retrieving, by the first adapter, the routing policy from the management queue.

4. The method of claim 1, further comprising:
parsing, by the first adapter, the identity governance message;
identifying, by the first adapter, an attribute from the identity governance message; and
selecting the routing policy based on the attribute.

5. The method of claim 1, further comprising, retrieving, by the second adapter, the routing policy from a management queue.

6. The method of claim 1, wherein the identity governance and administration system communicates in a first protocol and the first adapter includes logic configured to communicate in the first protocol, wherein the receiving the identity governance message from the first identity governance resource includes:
receiving the identity governance message by the first adapter in the first protocol from the first identity governance resource; and
wherein the second identity governance resource includes an information technology system having an identity governance data repository, wherein the information technology system communicates in a second protocol and the second adapter includes logic configured to translate the identity governance message to meet requirements of the second protocol, wherein the transferring the identity governance message from the output queue to the second identity governance resource includes:
transferring the identity governance message by the second adapter in the second protocol from the output queue to the second identity governance resource.

7. The method of claim 1, further comprising:
receiving, by the second adapter, an identity governance message from the second identity governance resource;
selecting, by the second adapter, a routing policy associated with the identity governance message received from the second identity governance resource; and
based on the routing policy associated with the identity governance message received from the second identity governance resource, writing the identity governance message received from the second identity governance resource to another select one of the plurality of input queues.

8. A system, comprising:
a first adapter of an identity governance exchange module, the first adapter being configured to receive an identity governance message from a first identity governance resource for transmission of the identity governance message to a second identity governance resource, wherein the first identity governance resource includes an identity governance and administration system and the identity governance exchange module is interposed between the identity governance and administration system and the second identity governance resource for identity governance message flow therebetween, the first adapter being further configured to:
analyze the identity governance message;
select, based on the analysis, a routing policy associated with the identity governance message;
based on the routing policy, determine a select input queue from a plurality of input queues of the identity governance exchange module to receive the identity governance message; and
write the identity governance message to the select input queue;
a queuing layer of the identity governance exchange module having the select input queue and configured to route the identity governance message from the select input queue to an output queue of the identity governance exchange module; and
a second adapter of the identity governance exchange module configured to retrieve the identity governance message from the output queue and transfer the identity governance message to the second identity governance resource.

9. The system of claim 8, wherein the first adapter is configured to retrieve the routing policy from a management queue of the queuing layer.

10. The system of claim 9, further comprising a management module of the identity governance exchange module, the management module being configured to:
receive the routing policy; and
write the routing policy to the management queue.

11. The system of claim 8, wherein the first adapter is configured to:
parse the identity governance message;
identify an attribute from the identity governance message; and
select the routing policy based on the attribute.

12. The system of claim 8, wherein the second adapter is configured to retrieve the routing policy from the queuing layer.

13. The system of claim 8, further comprising:
a management module of the identity governance exchange module, the management module being configured to:
receive a change to the routing policy; and
write the changed routing policy to the queuing layer; and
wherein the first adapter is configured to:
periodically access the queuing layer; and
retrieve the changed routing policy from the queuing layer.

14. The system of claim 8, wherein the first adapter is configured to:
determine whether the identity governance message corresponds to a high priority event;
responsive to determining that the identity governance message corresponds to the high priority event, identify a high priority queue in the queuing layer based on the routing policy; and
write the identity governance message to the high priority queue.

15. A computer program product for identity governance data exchange, the computer program product comprising:
one or more computer readable storage media, and program instructions collectively stored on the one or more computer readable storage media, the program instructions being executable by a processor to:
receive, by a first adapter of an identity governance exchange module, an identity governance message from a first identity governance resource for transmission of the identity governance message to a second identity governance resource, wherein the first identity governance resource includes an identity governance and administration system and the identity governance exchange module is interposed between the identity governance and administration system and the second identity governance resource for identity governance message flow therebetween;
analyze the identity governance message;
select, based on the analysis, a routing policy associated with the identity governance message;
based on the routing policy, determine a select input queue to receive the identity governance message, the select input queue being selected from a plurality of input queues in a queuing layer of the identity governance exchange module;
write the identity governance message to the select input queue;
route the identity governance message from the select input queue to an output queue in the queuing layer of the identity governance exchange module; and
transfer, by a second adapter of the identity governance exchange module, the identity governance message from the output queue to the second identity governance resource.

16. The computer program product of claim 15, wherein the program instructions are configured to:
write the routing policy to a management queue of the queuing layer; and
periodically access the management queue to retrieve the routing policy from the management queue.

17. The computer program product of claim 15, wherein the program instructions are configured to:
parse the identity governance message;
identify an attribute from the identity governance message; and
select the routing policy based on the attribute.

18. The computer program product of claim 17, wherein the program instructions are configured to:
determine whether the identity governance message corresponds to a high priority event;
responsive to determining that the identity governance message corresponds to the high priority event, identify a high priority queue in the queuing layer based on the routing policy; and
write the identity governance message to the high priority queue.

19. The computer program product of claim 15, wherein the program instructions are configured to:
receive an identity governance message from the second identity governance resource;
select, based on the identity governance message received from the second identity governance resource, a routing policy associated with the identity governance message received from the second identity governance resource; and
based on the routing policy associated with the identity governance message received from the second identity governance resource, write the identity governance message received from the second identity governance resource to another select one of the plurality of input queues of the queuing layer.

20. The computer program product of claim 19, wherein the program instructions are configured to manage queue-to-queue routing within the queuing layer.

\* \* \* \* \*